(12) United States Patent
Bry et al.

(10) Patent No.: US 9,143,349 B2
(45) Date of Patent: Sep. 22, 2015

(54) CONFIGURABLE MEDIA ACCESS CONTROLLER

(75) Inventors: Charles Bry, Unterhaching (DE); Bernhard Rohfleisch, Wolfratshausen (DE)

(73) Assignee: Lantiq Deutschland GmbH, Neubiberg (DE)

( * ) Notice: Subject to any disclaimer, the term of this patent is extended or adjusted under 35 U.S.C. 154(b) by 711 days.

(21) Appl. No.: 12/233,604

(22) Filed: Sep. 19, 2008

(65) Prior Publication Data

US 2010/0074263 A1 Mar. 25, 2010

(51) Int. Cl.
*H04L 12/28* (2006.01)
*H04L 12/413* (2006.01)
*H04L 12/24* (2006.01)
*H04B 10/27* (2013.01)
*H04L 12/46* (2006.01)
*H04M 7/00* (2006.01)
*H04L 1/16* (2006.01)

(52) U.S. Cl.
CPC .......... *H04L 12/413* (2013.01); *H04L 12/2834* (2013.01); *H04L 41/0806* (2013.01); *H04B 10/271* (2013.01); *H04L 1/1621* (2013.01); *H04L 12/4604* (2013.01); *H04L 12/4625* (2013.01); *H04L 2012/2841* (2013.01); *H04L 2012/2843* (2013.01); *H04M 7/0069* (2013.01); *Y04S 40/162* (2013.01)

(58) Field of Classification Search
CPC ......... H04L 12/26; H04L 12/28; H04L 12/46; H04L 29/06; H04L 69/32

USPC .............. 370/337, 341, 401, 468, 230, 230.1, 370/232, 233, 234, 235, 236, 329, 338, 343, 370/352; 455/552.1, 456.5; 709/230
See application file for complete search history.

(56) References Cited

U.S. PATENT DOCUMENTS

| | | | | |
|---|---|---|---|---|
| 6,065,073 | A  * | 5/2000 | Booth | 710/46 |
| 6,466,995 | B2 * | 10/2002 | Swales et al. | 710/11 |
| 6,671,284 | B1 * | 12/2003 | Yonge et al. | 370/462 |
| 6,839,345 | B2 * | 1/2005 | Lu et al. | 370/365 |
| 6,934,261 | B1 * | 8/2005 | Vo et al. | 370/255 |
| 6,987,770 | B1 * | 1/2006 | Yonge, III | 370/401 |
| 7,042,905 | B1 | 5/2006 | Johnson | |
| 7,054,309 | B1 * | 5/2006 | Hoot et al. | 370/360 |
| 7,209,442 | B1 * | 4/2007 | Chapman | 370/235 |
| 7,324,507 | B1 * | 1/2008 | Lo et al. | 370/360 |
| 7,496,076 | B2 * | 2/2009 | Takagi et al. | 370/338 |
| 7,539,143 | B2 * | 5/2009 | Moores et al. | 370/235.1 |
| 7,630,361 | B2 * | 12/2009 | Chapman et al. | 370/352 |
| 7,639,675 | B1 * | 12/2009 | Hoot et al. | 370/360 |
| 7,675,893 | B2 * | 3/2010 | Takagi et al. | 370/338 |
| 7,688,812 | B1 * | 3/2010 | Lo et al. | 370/360 |
| 7,787,387 | B2 * | 8/2010 | Huff | 370/248 |

(Continued)

FOREIGN PATENT DOCUMENTS

EP 0730382 A2 9/1996
EP 0846385 B1 11/2001

OTHER PUBLICATIONS

IEEE Std 802.11™—2007 Standard "Wireless LAN Medium Access Control (MAC) and Physical Layer (PHY) Specifications".

(Continued)

*Primary Examiner* — Brian O'Connor (57) ABSTRACT

Embodiments related to configurable Media Access Controllers (MACs) are described and depicted.

22 Claims, 6 Drawing Sheets

(56) References Cited

U.S. PATENT DOCUMENTS

| | | | |
|---|---|---|---|
| 7,804,851 B2* | 9/2010 | O'Mahony | 370/469 |
| 7,961,712 B2* | 6/2011 | Rabenko et al. | 370/352 |
| 8,089,983 B2* | 1/2012 | Asati et al. | 370/463 |
| 8,428,081 B2* | 4/2013 | Diab et al. | 370/464 |
| 8,649,386 B2* | 2/2014 | Ansari et al. | 370/401 |
| 2002/0146980 A1* | 10/2002 | Solondz et al. | 455/21 |
| 2004/0187156 A1* | 9/2004 | Palm et al. | 725/81 |
| 2005/0147071 A1* | 7/2005 | Karaoguz et al. | 370/338 |
| 2006/0209857 A1* | 9/2006 | Hicks, III | 370/401 |
| 2007/0155414 A1 | 7/2007 | Zhuang | |
| 2010/0020746 A1* | 1/2010 | Zaks | 370/328 |

OTHER PUBLICATIONS

"G.hn: Draft text for G.hn"—version 2.2 from ITU (Telecommunication Standardization Sector 08VS-R12).

* cited by examiner

CONFIGURABLE MEDIA ACCESS CONTROLLER

BACKGROUND

Communication is nowadays provided in digital form for many purposes and many types of applications. In digital communication a wide range of data types such as audio data, video data, digital TV data, email data, computer application data, etc are transmitted and distributed to devices to which they are respectively destined. The data may be provided at a user location to a single device such as a personal computer (PC) or to a plurality of devices such as a plurality of PCs or a plurality of different types of devices, for example personal computers, laptops or notebooks, handhelds, set-top boxes or television devices, wireless phones etc. To distribute the data at a user location, networks such as home networks are provided to connect a plurality of devices to provide a local area network (LAN) or other types of networks.

DETAILED DESCRIPTION

The following detailed description explains exemplary embodiments of the present invention. The description is not to be taken in a limiting sense, but is made only for the purpose of illustrating the general principles of embodiments of the invention while the scope of protection is only determined by the appended claims.

In the various figures, identical or similar entities, modules, devices, blocks etc. may have the same reference number assigned to them.

Figure 1:
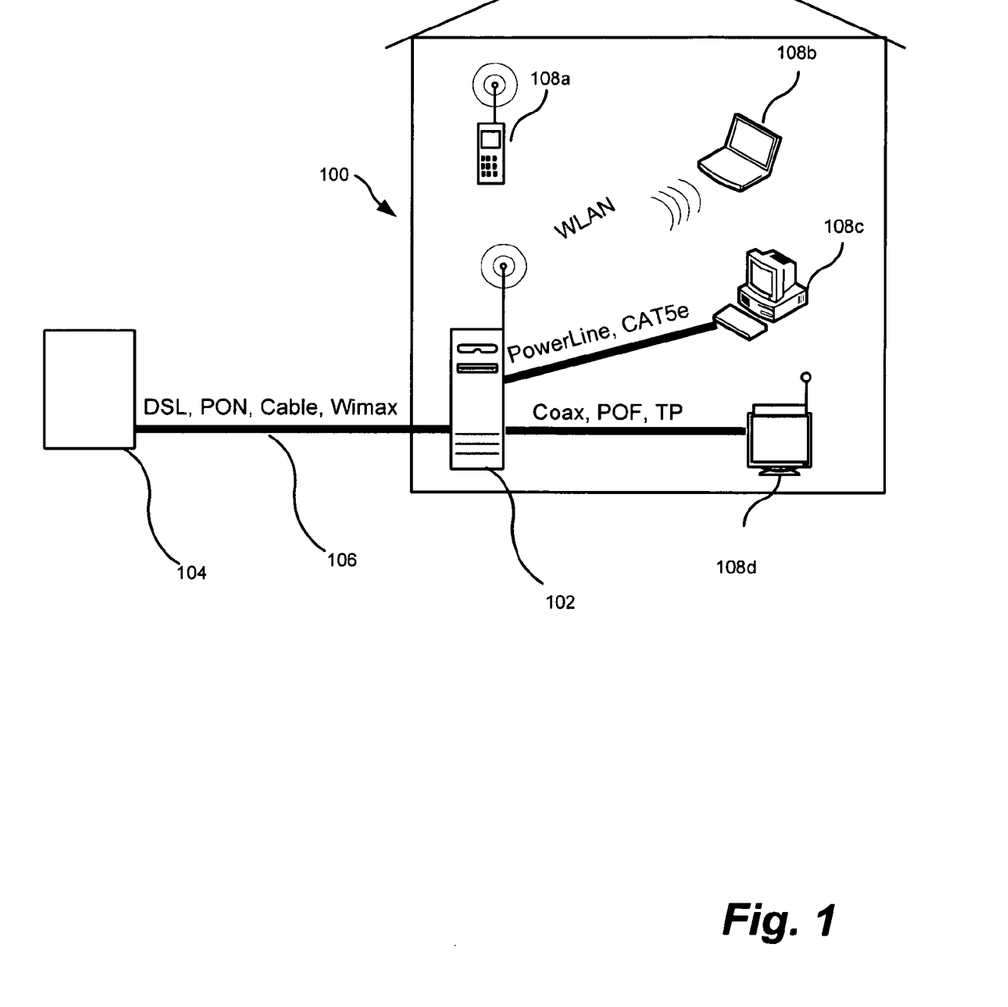
FIG. 1 shows a schematic diagram according to an embodiment of the present invention.

FIG. 1 shows an exemplary embodiment of a home network system 100. Home network system 100 comprises a gateway device 102 which is coupled via a communication link 106 to an exchange device 104 at the operator end such as a Central Office, a street cabinet or any other type of wired or wireless exchange device at the operator end. Communication link 106 may be a wired broadband communication link such as a DSL (digital subscriber line) link, a passive optical network (PON) link, a cable communication link, or a wireless broadband communication link such as a WIMAX (Wireless Worldwide Interoperability for Microwave Access) link.

As shown in FIG. 1, a plurality of stations (devices) 108a-d are coupled to the gateway 102 using different types of transmission media. Transmission media are categorized into a wireless transmission medium and different types of wired transmission media such as a coax cable, a twisted pair phone line, a power line, an Ethernet cable, an optical fibre etc. For example, a wireless phone 108a may be coupled to the gateway 102 via a Wireless LAN (WLAN) link, a laptop 108b may be coupled to the gateway 102 via a WLAN link, a PC 108c may be coupled to the gateway 102 via a power line or an Ethernet cable, and a TV 108d including a set-top box may be coupled to the gateway 102 via a coax, a Plastic Optical Fibre (POF) or a twisted pair link. It is to be understood that the above links and stations are only exemplary and that other embodiments of home network systems may include other types of devices and may include other types of links to connect to the respective devices. It is further to be noted that the system may be operated or selected such that only one of the above links is active while the others are inactive. Furthermore, the system may be operated to allow a plurality of links to be active at the same time, i.e. data are transmitted at the same time over a plurality of links.

Figure 2:
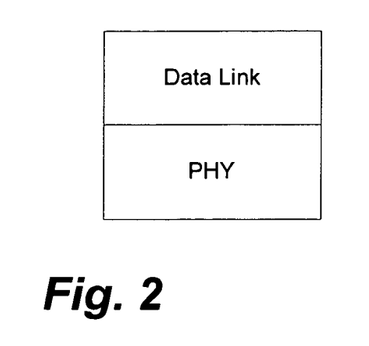
FIG. 2 shows a layer diagram according to an embodiment of the present invention.

In data communication, hierarchical models such as the OSI layer model are used for describing and implementing the communication protocols. FIG. 2 shows the lowest two layers of the OSI model which are also referred to as the physical layer (PHY layer) and the data link layer of the OSI model.

To implement transmission on different types of transmission media, the gateway 102 implements the data link layer by a medium access controller (MAC), which is configurable according to the transmission medium selected for transmission as will be explained in more detail below. The use of a configurable MAC as described herein allows more flexibility and reduces cost for implementing more than one transmission medium by using similarities or synergies of MAC functionalities and/or similarities or synergies in the order of functional blocks within the MAC for the different transmission media.

Figure 3:
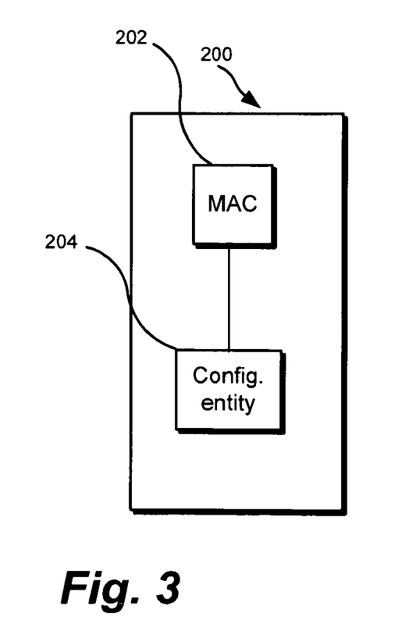
FIG. 3 shows a block diagram according to an embodiment of the present invention.

FIG. 3 shows one embodiment of a transceiver device 200 which may be used in the gateway 102 or any other station of the home network shown in FIG. 1. Transceiver device 200 comprises a MAC 202 which may be implemented in software, hardware or a combination thereof. MAC 202 is coupled to an entity 204 dedicated to configure MAC 202 based on information indicating a transmission medium used by the transceiver device. Entity 204 may be implemented as software, hardware or any combination thereof. Furthermore, while FIG. 3 shows the MAC 202 and entity 204 as separated blocks it is to be understood that hardware and/or software of MAC 202 and hardware and/or software of entity 204 may be partly or fully integrated in a common hardware and/or common software.

According to one embodiment, the entity 204 may be a software service running on the same CPU as the software implementing the MAC 202. A driver software on a separate CPU, for example a host CPU, may be used in conjunction with the above implementation. According to one embodiment, the entity 204 may load for each transmission medium a specific configuration parameter set into configuration registers of the MAC 202 and/or may load software routines specific for each transmission medium into code memories of computational units within the MAC 202.

The information indicating the transmission medium may be provided to the entity 204 upon initializing the home network system or when setting up i.e. connecting a new device, or dynamically as dictated by the applications running in parallel and/or respective traffic loads or profiles on the different media, to give just a few examples. For example, when a PC and TV are both connected to a WLAN and the PC starts to download a huge file, transmission to the TV may switch from a WLAN to a power line transmission.

According to one embodiment, the configuration of the MAC is executed during a start-up of the system, i.e. before operation on a medium begins. According to one embodiment, the information may be provided by a user or service person via a user interface using a keyboard, a touch screen or other input device to provide the information to entity 204. According to one embodiment, the information may be generated automatically by the system by detecting transmission media capabilities of devices currently active of the home network system. According to one embodiment, the system may generate this information automatically by monitoring when applications are started or stopped, in case this could cause a change in traffic loads and traffic patterns and necessitate reconfiguration e.g. because of quality of service requirements.

Based on the provided transmission medium information, the MAC 202 is configured in various manners and various parameters of data communication and protocol stacks may be set based on the transmission medium information.

According to embodiments, the entity 204 is capable of configuring MAC 202 to allow in a first operation mode MAC operation for at least one wireless communication (i.e. to implement all MAC functions required for a transmission in keeping with IEEE specifications for wireless networks) and in a second operation mode MAC operation for at least one type of non-wireless communication such as Ethernet cable, twisted pair line, power line, coax cable (i.e. to implement all MAC functions required for a transmission according to e.g. ITU G.hn recommendations), while using single hardware and/or software. According to one embodiment, a combined MAC for WLAN and wired home networking is provided by using a single MAC 202 to perform the medium access for any of the transmission media.

According to one embodiment, the entity 204 is capable of configuring MAC 202 to allow at least one of the following: a wireless transmission, a coax cable transmission, a twisted pair line transmission, a power line transmission, an Ethernet cable transmission and an optical fibre transmission.

According to one embodiment, the entity 204 is capable of configuring MAC 202 to allow at least a coax cable transmission, a twisted pair line transmission and a power line transmission.

According to one embodiment, configuration of the MAC 202 may include a configuration of one or more parameters which do not change the functional flow within the MAC 202 and/or one or more parameters which change the functional flow, for example parameters which change the order of functional blocks or parameters which enable or disable specific functional blocks within the MAC 202. The parameters which do not change the functional flow may help to tune the behavior of the functional blocks to meet the channel requirements or characteristics of the specific medium. The parameters which change the functional flow may in addition allow a better handling or optimization of the transmission for example by using additional functional blocks for noise protection such as an additional FEC (forward error correction) block. In one embodiment, in order to allow full MAC operation for the different transmission media, the MAC 202 can be configured to enable the full superset of functions in terms of the hardware resources and/or in terms of the computational power for a software implementation.

According to one embodiment, the types of parameters which the entity 204 is capable of configuring include one of the following: an access parameter of the medium, a packet/frame parameter, formats (with variable or fixed packet size) transmitted over the transmission medium, protocol parameter and Quality-of-Service parameter.

According to one embodiment, the entity 204 is capable to configure combinations of the above parameters of MAC 202, i.e. multiple of the group of parameters including an access parameter of the medium, a packet/frame parameter, formats transmitted over the transmission medium, a protocol parameter and Quality-of-Service parameter.

According to one embodiment, the entity 204 is capable of configuring parameters of MAC 202 to allow in a first configuration MAC processing according to the specification of wireless IEEE 802.11 standard and in a second configuration according to the specification of home networking standard ITU G.hn.

Figure 4:
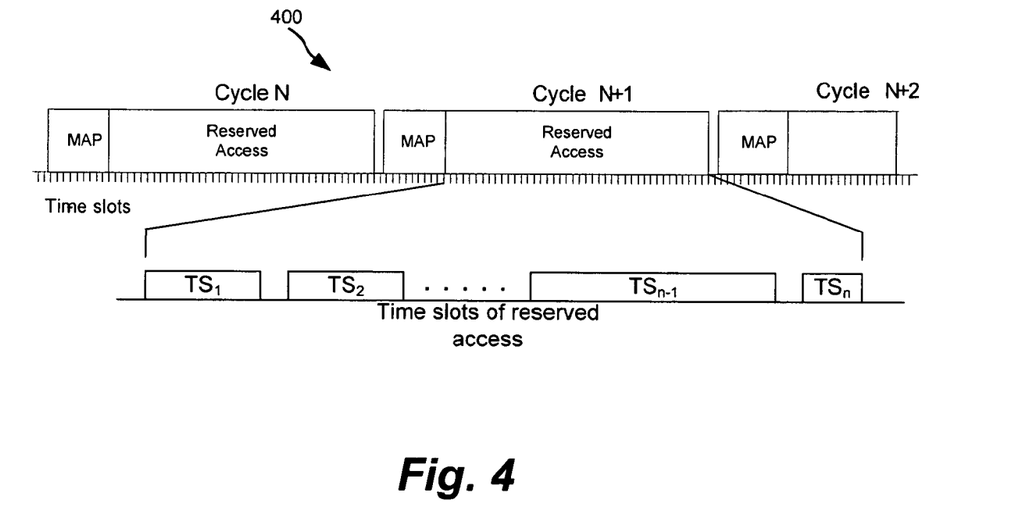
FIG. 4 shows a schematic diagram according to an embodiment of the present invention.

In the IEEE 802.11 WLAN and the ITU G.hn standard as well as other standard specifications, access to the medium may be provided by using a cyclic structure. FIG. 4 shows an example of such a cyclic structure 400 including MAC cycles N, N+1 and N+2. Each periodic MAC cycle may start as shown in FIG. 4 with the distribution of a media access plan (MAP). MAP indicates the start of the cycle. The MAP contains information on the partitioning of the MAC cycle into transmission opportunities TS1, TS2 . . . TSn-1, TSn which are exactly timed, i.e. a starting and ending point of each transmission opportunity or a starting point and a size (duration) of each transmission opportunity are provided. Some of the transmission opportunities may be assigned to single individual stations (nodes) to be used for transmission, while some may be shared-contention transmission opportunities during which a plurality of devices compete for access to the transmission medium.

For the shared-contention transmission opportunities an access scheme for example Ethernet-like CSMA/CD (carrier sense multiple access/collision detection) or WLAN-like CSMA/CA (carrier sense multiple access/collision avoidance) schemes may be used including a back off mechanism wherein colliding nodes wait a random time before trying to access the medium again.

In CSMA/CA networks, collisions can occur, and they are detected by the sender and mitigated by an acknowledge handshake and retransmission. To reduce the probability of collisions, the CSMA/CA mechanism (e.g. as defined in the 802.11 specification) uses a random back off procedure, which is described in the following. A device that intends to access the medium has to first establish that the medium is idle by using "carrier sensing". Carrier sensing is based on two approaches: physical carrier sensing is based on measuring the power received in the frequency range of the selected channel. In addition, virtual carrier sensing may be performed by evaluating the duration field of 802.11 frames. The duration field indicates how long the medium is reserved for the currently on-going frame exchange sequence. A medium is defined to be idle if both physical and virtual carrier sense signals indicate "off" (if both carrier sense signals are in use). Before any device can attempt a medium access, the medium has to be detected idle for a specified period of time called interframe space (IFS). At the end of the IFS, the contention window (CW) starts. The CW is divided into an integer number of fixed-size back-off slots. The device randomly picks one of the slots in the CW and senses the medium until its selected slot starts. If the device detects that another node has started a transmission before the beginning of the slot it has randomly selected, it defers its transmission until the current frame sequence has finished. If no other transmission is sensed the device starts its transmission.

The method described above reduces the probability of collisions because the method scatters the starting times of the different nodes competing for the medium within the contention window.

To further reduce the probability of collisions in given situations, the size of the contention window may be made adjustable, as is done in the IEEE 802.11 WLAN specification, applying for instance an exponential increase to the contention window every time after an unsuccessful attempt to transmit a frame causes a retry counter to be incremented.

While the structure of the MAC cycle described above may be the same or similar for the different transmission media, differences of the values of parameters may exist when using the above MAC cycle scheme or a similar MAC cycle scheme for the different transmission media. According to one embodiment, the parameters of the MAC cycle scheme may be made configurable in order to use the same MAC for MAC cycles of different transmission media such as for example MAC cycles according to the IEEE 802.11 WLAN standard and MAC cycles according to the ITU standard G.hn.

Access parameters which may be configured include parameters related to the above MAC cycle as well as other access parameters specific for the transmission medium. The access parameters which may be configured include parameters such as the size of interframe spaces, the size of time slots (such as the size of the back-off slots described above), the size of time windows (for example the size of the contention window defined equal to the maximum number of back-off time slots), a starting and ending of slot times (as for example in the case of deterministic allocation of transmission time slots), parameters to control the changes of the size of the contention window as a result of retransmissions as described above, structure and timing of the MAC cycle, a maximum size and/or minimum size of a time window (such as an absolute maximum and/or minimum size of the contention time window described above), a counter value such as for example a counter value for a retry counter that limits the number of retries allowed when a transmission is not successful, a maximum value and/or a minimum value to limit the range of specific counter values, a transmission rate for retransmission and a rate selection scheme for retransmission.

Furthermore, according to one embodiment the protocol parameters which may be configured by the entity 204 include one or more acknowledgement parameters or one or more handshake parameters. The one or more acknowledgment parameters or the one or more handshake parameters may be for example an order or a sequence in which signals or information related to the handshake or the acknowledgement is transmitted. Furthermore, different types of acknowledgement structures i.e. a single (atomic) acknowledgement structure wherein each transmitted data frame is acknowledged separately or a block acknowledgement structure wherein an acknowledgment is started only after a plurality of data frames have been transmitted over the medium may be used. Therefore, protocol parameters may include parameters related to information whether a single acknowledgement structure or a block acknowledgement structure is used as well as specific parameters of the acknowledgement such as the size and information of the acknowledgement signal and the specific configuration of the single acknowledgement or the block acknowledgement. For example, in the case of block acknowledgement, a parameter may control the number of outstanding frames before a block acknowledgement has to be sent. Furthermore, the configured parameter may be a parameter indicating a selection of an acknowledgement mode, i.e. whether a negative or a positive acknowledgement is selected for acknowledgement implementation.

According to one embodiment, the configuration parameters may be related to the type of network topology used for the transmission medium. For example, a WLAN may be operated in an infrastructure mode wherein all traffic within a basic service set is going via the access point associated with this basic service set. In other transmission media, a direct data transfer between stations may be used, for example a peer-to-peer transmission which may or may not be provided with QoS (Quality of Service) functionality. In 802.11, rather than allowing stations to send/receive data at random times, a PSMP (power save multipoll) functionality may be used to schedule the times when an access point and different stations are allowed to transmit and should be able to receive frames, which has the effect of allowing the stations to save power. According to one embodiment, this functionality may be extended to include the above functionality of a peer-to-peer transmission for WLAN according to 802.11.

As noted above, the virtual carrier sense mechanism is achieved by distributing reservation information that announces to all connected stations (nodes) that a medium will be "busy" for a certain time as indicated in the duration field of the frame. The exchange of request to send (RTS) and clear to send (CTS) frames prior to an actual data frame is one means of distributing this medium reservation information. The RTS and CTS frames contain a duration field that defines the period of time during which the medium is going to be reserved in order to complete the data exchange (including acknowledgements). All stations within the reception range of either the originating station (which transmits the RTS) or the destination station (which transmits the CTS) will hear the reservation. This mechanism has the advantage of covering "atomic frame exchange" sequences which cannot be interrupted by any other station, and it can be used to secure the medium and check the transmission path before data transmission per se. It also deals with partly hidden stations/nodes (hidden either to the originating or the destination station). Use of RTS/CTS implies an overhead which may not be desirable, particularly in the case of short data frames, and thus its operation should be configurable to apply to certain frames but possibly not to others. This is sometimes implemented by the use of a minimum frame length threshold above which RTS/CTS protection is enabled.

According to one embodiment, the configurable parameters may include frame parameters (parameters related to the size, content or structure of frames) such as a threshold for a MAC Service Data Unit (MSDU) aggregation, a threshold for a MAC Protocol Data Unit (MPDU) aggregation, a threshold for fragmentation and a threshold for protection such as a threshold for transmission of RTS/CTS protection as explained above.

According to one embodiment, the configurable parameters may include one or more QoS parameters. QoS parameters may include for example an AIFS (Arbitration Interframe Space) value which defines a period of time during which the medium has to be idle before a station can access the wireless medium. For example, AIFS, as defined in the 802.11e standard, is a parameter that depends on the Access Category (AC) to which that frame is assigned. Other configurable QoS parameters may include contention window size limits which also depend on the AC. Further configurable QoS parameters may include the number of access categories provided, the number of queues for traffic or QoS classes at the higher (application) level and/or a mapping scheme for mapping a plurality of traffic classes to the available access categories. For example, according to the 802.11e standard four access categories are provided and the traffic classes have to be mapped to four access categories while in the G.hn Home network standard eight access categories are provided and the traffic classes are mapped therefore to eight access categories.

Figure 5:
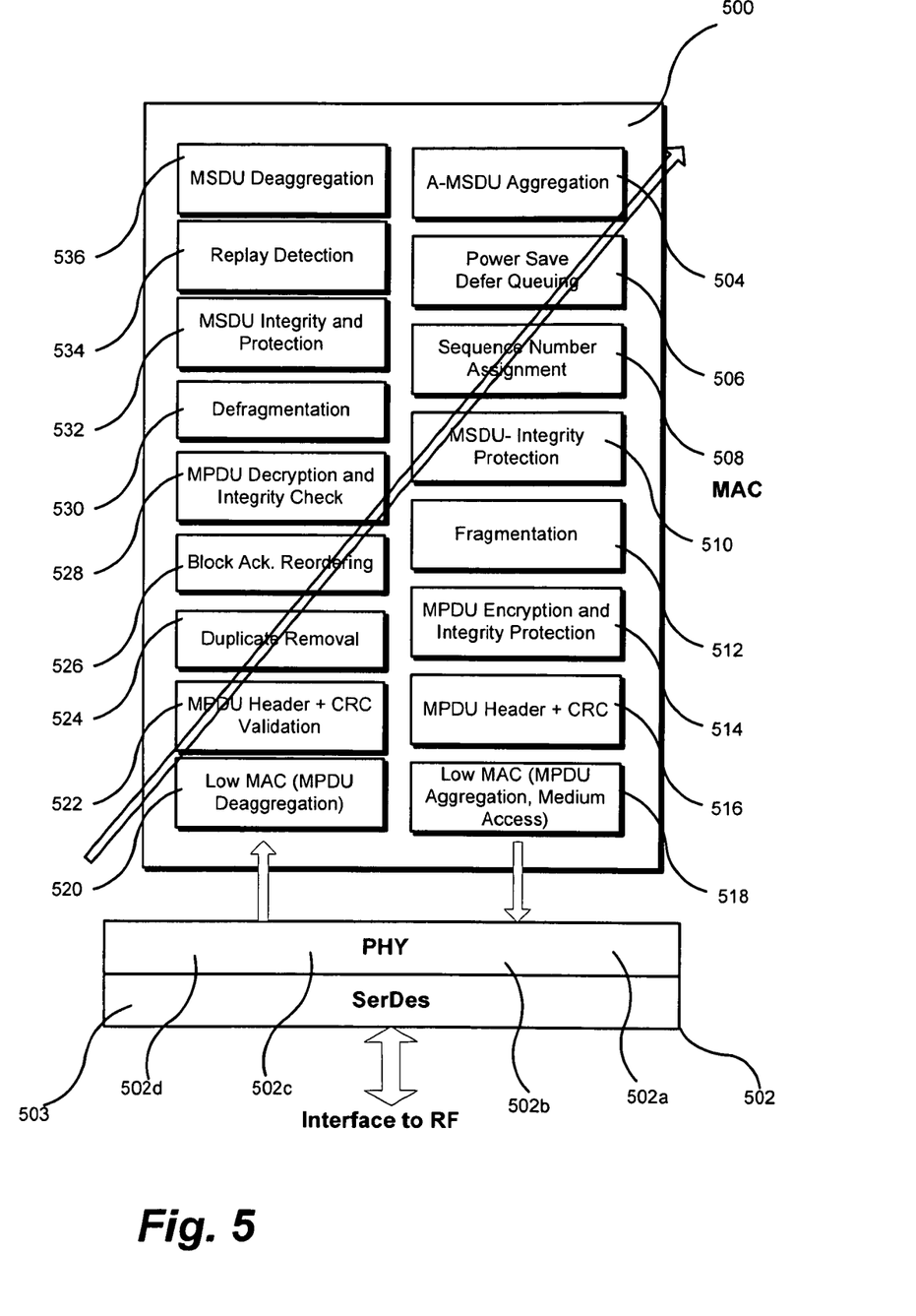
FIG. 5 shows a block diagram according to an embodiment of the present invention.

Turning now to FIG. 5, a further embodiment will be described implementing a configurable MAC common for 802.11 and G.hn operation. FIG. 5 shows a diagram of a configurable MAC 500 and PHY 502. It is to be noted that the arrow shown across MAC 500 indicates that MAC 500 is a configurable MAC as described above. Configurable MAC 500 includes for transmission and reception a plurality of functional blocks, each of which may be configurable as described above. However, according to an embodiment, only some of the functional blocks may be configurable. Furthermore, the MAC 500 may be configurable by enabling or disabling specific functional blocks as described above or changing the order of the functional flow.

Starting with the functional blocks for the transmission path of MAC 500, a block 504 of MAC 500 provides MSDU aggregation. In block 504, multiple MSDUs are aggregated to provide an A-MSDU (Aggregate MSDU). Configuration parameters for this block may include for example a threshold for the MSDU aggregation such as a maximum size for the A-MSDU.

In the next functional block 506 of the transmission path a power save defer queue functionality is provided. Power save defer queuing is a function provided for access points or IBSS networks wherein during a power saving mode frame delivery is deferred. Configurable parameters may include for this block a schedule for the times when frames can be delivered.

At functional block 508, sequence numbering is provided, i.e. an identification number is assigned to each (A-)MSDU. In functional block 510, Integrity protection is provided. It is to be noted that functional blocks 504, 506 and 510 may be optional features and may therefore not be implemented in some embodiments.

At functional block 512, the (A-)MSDU is fragmented in a plurality of MPDUs. Configuration parameters of this block may include for example the size of MPDUs.

At functional block 514, Encryption and Integrity functionality is provided for the MPDUs.

At functional block 516, a header for each MPDU is generated and added to each MPDU and the CRC checksum is calculated and added to each MPDU. In functional block 518, low-MAC functions such as an aggregation of MPDUs is performed. Functional block 518 is coupled to PHY chains 502a-502d of PHY 502. PHY chains 502a-502d are coupled to a Serializer/Deserializer or DA/AD converter 503 of PHY 502 providing a coupling to a RF circuit. A Serializer/Deserializer may be used when a digital interface between the baseband and RF is provided. A DA/AD converter may be used when an analog interface between baseband and RF is provided.

In the receiving path of the MAC 500, a functional block 520 is coupled to the PHY chains 502a-502d. Functional block 520 implements low-MAC functions for the MPDUs received from the PHY 502 including for example the deaggregation of any aggregated MPDUs.

At functional block 522, the header and the CRC check sum of each MPDU is validated.

At functional block 524, duplicates of MPDUs transmitted multiple times are removed. Duplicates can for example arise if a frame has been received and the acknowledgement frame has been corrupted. In this case the sender retransmits the frame, which leads to a duplicate frame at the receiver.

At functional block 526, reordering of the received MPDUs is performed, which is a step that is required if block acknowledgement for a block of MPDUs is used. It is to be noted that functional block 526 may be disabled when no block acknowledgement is configured for MAC 500.

At functional block 528, decryption and integrity check functionalities are provided for the received MPDUs. It is to be noted that block 528 includes the reverse functionality of functional block 514 that implements encryption and integrity protection in the transmit path.

At functional block 530, the received MPDUs are defragmented such that A-MSDUs or MSDUs are generated based on the received MPDUs. Functional block 530 has the inverse functionality to functional block 512 in the transmit path.

At functional block 532, Integrity and Protection functionality is provided for the received (A-)MSDU. Block 532 has the reverse functionality of block 510 and is like block 510 optional.

At functional block 534, replay detection is performed. Replay detection is a security measure against replay attacks where an attacker intercepts and retransmits valid frames.

Finally, at functional block 536, the A-MSDUs are deaggregated to obtain individual MSDUs. If present, block 536 implements the reverse of the functionality of block 504.

While one or more of the functional blocks 504 to 536 may be configurable, it is to be understood that MAC 500 may also be configurable by enabling or completely disabling one or more of the functional blocks 504-536. Thus, within the scope of possible embodiments, a combined configuration is provided wherein not only one or more of the blocks are individually configurable but also the process flow provided by functional blocks 504-536 is configurable.

It is further to be noted that in some embodiments, the MAC 500 may be capable of implementing MAC processing for MIMO operation for example according to the initial WLAN 802.11n draft. Accordingly, the PHY 502 is able to process the data stream as multiple spatial streams for MIMO (up to four in the case of the 802.11n specification). The number of antennae supported by the RF front end coupled to the PHY 502 is at least equal to the number of spatial streams supported by the PHY 502.

It is to be noted that the MAC 500 may be implemented in a station (client station or access point station) as the only MAC provided for the station. Such embodiments may be provided for stations wherein not more than one transmission medium is used at any one time.

Figure 6:
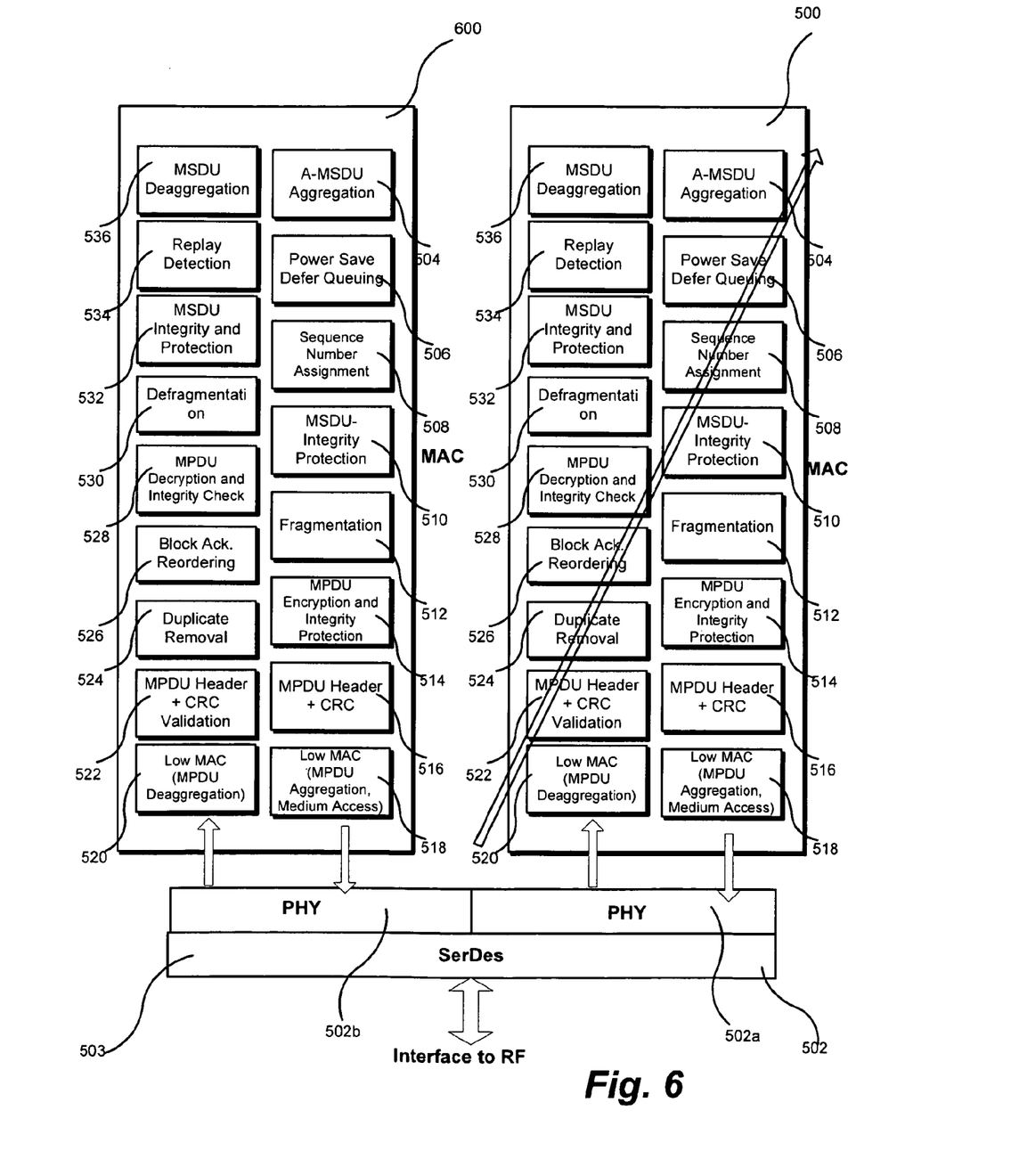
FIG. 6 shows a block diagram according to an embodiment of the present invention.

FIG. 6 shows a further embodiment wherein more than one MAC is implemented in a station allowing simultaneous transceiving for the station on different transmission media. According to this embodiment, configurable MAC 500 is implemented in a station together with a further MAC 600. The further MAC 600 may be a non-configurable MAC as shown in FIG. 6, i.e. a MAC dedicated to one specific transmission medium or one specific communication standard. However, according to other embodiments, the further MAC 600 may be a configurable MAC, for example a MAC similar or identical to MAC 500 described with respect to FIG. 5.

As can be seen in FIG. 6, MAC 500 and MAC 600 are both coupled to PHY 502 implementing the PHY operation for the two MACs.

As shown in FIG. 6, each of the MACs 500 and 600 has the same functional blocks as described with respect to FIG. 5 wherein MAC 500 is configurable as described above and MAC 600 is a non-configurable dedicated MAC. In other embodiments, MAC 500 and MAC 600 may have different functional blocks. According to one embodiment, MAC 600 is a dedicated WLAN MAC whereas MAC 500 is a MAC configurable as a WLAN MAC or a MAC for home networking as described above.

According to one embodiment, the MAC 500 and 600 process two concurrent data streams that are also processed by two PHYs. Different configuration modes are selectable.

In a first configuration mode, both MAC 500 and MAC 600 operate in a WLAN transmission mode, for example according to 802.11. In the case of 802.11 a data stream may be processed by a PHY as more than one spatial stream for MIMO operation. The two operations provided by the two MACs may be operations for transmission on different RF frequency bands. For example, one MAC may provide operation for a transmission on the 2.4 GHZ band and the other MAC may provide operation for a transmission on the 5 GHZ band as defined in the 802.11 standard. According to one embodiment, a WLAN repeater mode may be implemented by using the two MACs wherein one of them (with its PHY) may be used to provide a wireless connection to a root access point or another repeater on the WLAN and the other one of the MACs is used to provide a wireless connection to stations which may include further repeaters. By this implementation, concurrent transmissions between the root access point and the repeater and between the repeaters and the associated stations can be realized. By providing the wireless data communication to the repeater, it may be no longer necessary to provide a wired connection between the repeaters of a WLAN thereby enhancing flexibility and lower costs.

In a second configuration mode, the configurable MAC 500 may be configured to provide home networking operation on a wired transmission medium. At the same time MAC 600 provides operation for a WLAN transmission.

While FIG. 6 shows two MACs provided within a station, it is to be understood that other embodiments may implement more than 2 MACs (for example 3 or 4 MACs) within the station, wherein one or more of the MACs may be configurable as described above. According to one embodiment, more than 2 MACs (for example 3 or 4 MACs) may be implemented in one station wherein all of the MACs are configurable as described above.

It is further to be noted that in the embodiments of multiple MACs, the MACs may be partially or fully implemented in software and using a same computational unit (CPU).

In embodiments, dedicated PHYs may be used for each operation mode and the MACs 500 may be coupled to the respective PHY as required by the configuration for example by using a switch.

Figure 7:
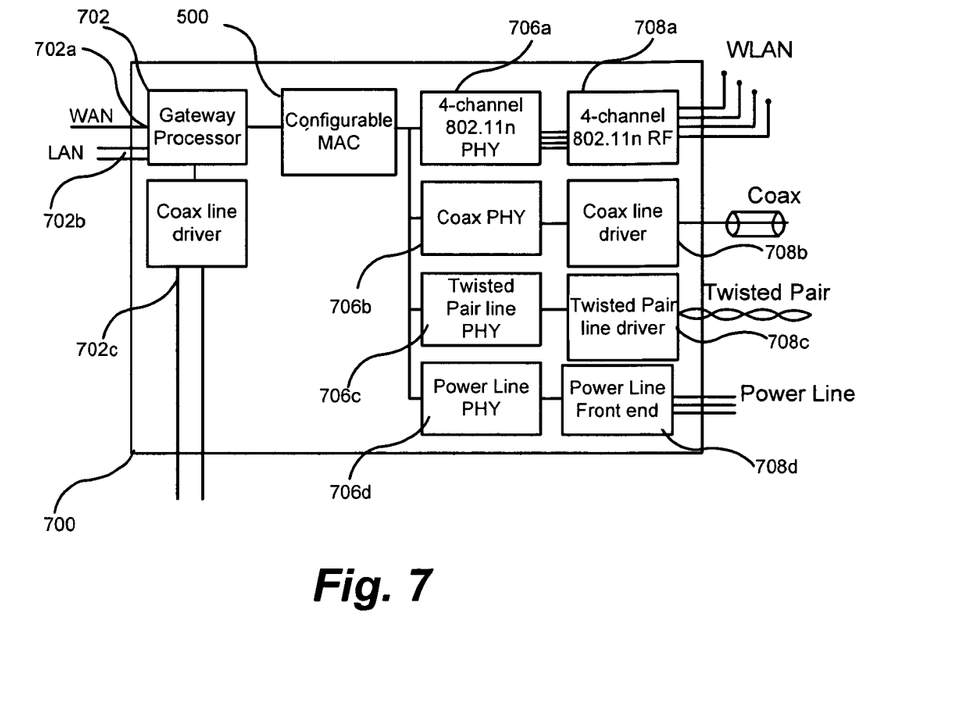
FIG. 7 shows a block diagram according to an embodiment of the present invention.

Referring to FIG. 7, one exemplary embodiment of a gateway station implementing a configurable MAC with a plurality of dedicated PHYs is shown. A gateway 700 comprises a gateway processor 702, which provides a variety of interfaces. It may be connected via a WAN interface 702a to a provider's exchange device. An exchange device may for example be a Central Office, a street cabinet etc. Furthermore, the gateway processor provides LAN interfaces 702b and SLIC interfaces 702c to POTS devices. The gateway processor 702 may provide routing capabilities on level 3 of the OSI model for the data packets transmitted and received by gateway 700.

Gateway processor 702 is coupled to the configurable MAC 500. MAC 500 is coupled to one of a plurality of PHYs 706a, 706b, 706c and 706d. In the embodiment of FIG. 7, PHY 706a implements a 4-channel MIMO PHY according to 802.11, PHY 706b implements a coax PHY, PHY 706c implements a twisted pair PHY and PHY 706d implements a power line PHY. The PHYs 706a-d are coupled to corresponding analog front end circuits 708a-d. In particular, each of the four PHY chains of PHY 706a is coupled to an active RF chain of a RF circuit 708a, the PHY 706b is coupled to a coax front end circuit 708b, the PHY 706c is coupled to a twisted pair front end circuit 708c and the PHY 706d is coupled to a power line front end circuit 708d. The front end circuits 708a-d transmit the signals in accordance with the corresponding transmission medium. Therefore, each of the RF chains of the front end circuit 708a is coupled to an antenna for providing WLAN transmission, the front end circuit 708b is coupled to a coax line, the front end circuit 708c is coupled to a twisted pair line and the front end circuit 708d is coupled to a power line.

While in the embodiment according to FIG. 7 only one configurable MAC is provided, it is to be understood that in other embodiments station 700 may include more than one MAC entities as described above.

In the above description, embodiments have been shown and described herein enabling those skilled in the art in sufficient detail to practice the teachings disclosed herein. Other embodiments may be utilized and derived there from, such that structural and logical substitutions and changes may be made without departing from the scope of this disclosure.

This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

It is further to be noted that specific terms used in the description and claims may be interpreted in a very broad sense. For example, the terms "circuit" or "circuitry" used herein are to be interpreted in a sense not only including hardware but also software, firmware or any combinations thereof. The term "data" may be interpreted to include any form of representation such as an analog signal representation, a digital signal representation, a modulation onto carrier signals etc. Furthermore the terms "coupled" or "connected" may be interpreted in a broad sense not only covering direct but also indirect coupling.

It is to be noted that the terms "home networking" or "home network" used herein may be interpreted in a broad sense and are not restricted to private locations at a user's home. Thus, home networking includes networks of different transmission media which may be installed or operated at a private home of a user as well as in business locations or other non-residential locations.

Furthermore, it is to be noted that the term "station" is also to be interpreted in a broad sense to include access point stations, client stations, repeater stations or other devices capable of providing communication on at least one of the transmission media of the system.

The accompanying drawings that form a part hereof show by way of illustration, and not of limitation, specific embodiments in which the subject matter may be practiced.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim.

It is further to be noted that methods disclosed in the specification or in the claims may be implemented by a device having means for performing each of the respective steps of these methods.

What is claimed is:

1. A method comprising:
   providing information indicating a transmission medium of a plurality of distinct transmission media of a gateway for transmitting in a home networking system; and
   configuring a medium access controller of the gateway based on the information, wherein the medium access controller comprises a single medium access controller (MAC), wherein the medium access controller including at least a plurality of functional blocks that are each configurable with respect to one or more parameters to enable communication with the plurality of distinct transmission media,
   wherein the step of configuring includes further configuring the medium access controller based on the indicated transmission medium by setting said one or more parameters for the indicated transmission medium that form a superset of functions to allow full media access controller operation for the indicated transmission medium.

2. The method according to claim 1, wherein the information indicates one of the following transmission media:
   a wireless transmission;
   a coax cable transmission;
   a twisted pair line transmission;
   a power line transmission;
   an Ethernet cable; and
   an optical fibre transmission.

3. The method according to claim 1, wherein configuring the medium access controller comprises at least one of the following:
   configuring an access parameter of the medium;
   configuring a frame parameter and/or frame format of packets transmitted over the transmission medium;
   configuring a protocol parameter; and
   configuring a Quality-of-Service parameter.

4. The method according to claim 3, wherein configuring a Quality of Service parameter comprises at least one of the following:
   configuring an interframe space;
   configuring a contention window size;
   configuring a number of traffic classes;
   configuring a number of queues;
   configuring a mapping of traffic classes to access categories of the transmission medium;
   configuring a maximum number of retries when transmission has failed; and
   configuring at least one limit within which contention window size changes when a frame transmission has failed.

5. The method according to claim 3, wherein configuring a protocol parameter comprises configuring an acknowledgement parameter or a handshake parameter.

6. The method according to claim 5, wherein configuring an acknowledgement parameter or a handshake parameter comprises configuring at least one of the following parameters:
   a block acknowledgement configuration;
   a single acknowledgement configuration;
   a selection of a negative or a positive acknowledgement mode; and
   a packet used for acknowledgement.

7. The method according to claim 3, wherein configuring a frame parameter and/or frame format comprises at least one of the following steps:
   configuring a threshold for a MSDU aggregation;
   configuring a threshold for a MPDU aggregation;
   configuring a threshold for fragmentation; configuring a threshold for protection;
   configuring a format and a header field of data frames;
   configuring a format and a header field of control frames; and
   configuring a format and a header field of management frames.

8. The method according to claim 3, wherein configuring an access parameter to the medium comprises at least one of the following steps:
   configuring a size of time windows,
   configuring a size of an interframe space;
   configuring a size of a time slot;
   configuring the starting and ending time of slot times;
   configuring limits of a contention window; configuring a MAC cycle structure;
   configuring a maximum size and minimum size of a time window;
   configuring a counter value;
   configuring a maximum and minimum value of a counter value;
   configuring a transmission rate for retransmission; configuring a rate selection adaption scheme.

9. The method according to claim 1, further comprising
   providing a further media access controller;
   selecting a transmission medium;
   configuring said medium access controller based on the selected transmission medium;
   receiving from a wide area network first and second data at the gateway;
   processing the first data in said medium access controller and processing the second data in said further medium access controller;
   transferring the processed first and second data to a transmitter;
   transmitting the processed first and second data over one or more transmission mediums.

10. The method according to claim 1 wherein the information indicates enabling and disabling of functional MAC blocks or changing an order of MAC processing functions.

11. A transceiver device comprising:
   a medium access controller; and
   an entity to configure the medium access controller based on information indicating a transmission medium of a plurality of distinct transmission media of the transceiver device, wherein the medium access controller comprises a single medium access controller (MAC), wherein the medium access controller includes at least a plurality of functional blocks that are each configurable with respect to one or more parameters to enable communication with the plurality of distinct transmission media wherein the entity further configures the medium access controller based on the indicated transmission medium by setting said one or more parameters for the indicated transmission medium that form a superset of functions to allow full media access controller operation for the indicated transmission medium.

12. The device according to claim 11, wherein the entity is adapted to configure the medium access controller based on information indicating one of the following transmission media:
   a wireless transmission;
   a coax cable transmission;
   a twisted pair line transmission;
   a power line transmission;
   a Ethernet cable; and
   an optical fibre transmission.

13. The device according to claim 11, wherein the entity is adapted to configure at least one of the following medium access parameters:
   an access parameter of the medium;
   a frame parameter and/or frame format of packets transmitted over the transmission medium;
   a protocol parameter; and
   a Quality-of-Service parameter.

14. The device according to claim 13, wherein the Quality of Service parameter comprises at least one of the following parameters:
   an interframe space;
   a contention window size;
   a number of traffic classes;
   a number of queues;
   a mapping of traffic classes to access categories of the transmission medium;
   a maximum number of retries when transmission has failed; and at least one limit within which contention window size changes when a frame transmission has failed.

15. The device according to claim 13, wherein the protocol parameter comprises an acknowledgement parameter or a handshake parameter.

16. The device according to claim 15, wherein the acknowledgement parameter or the handshake parameter comprises at least one of the following parameters:
   a block acknowledgement configuration;
   a single acknowledgement configuration;
   a selection of a negative or a positive acknowledgement mode; and
   a packet used for acknowledgement.

17. The device according to claim 13, wherein a frame parameter and/or frame format comprises at least one of the following parameters:
   a threshold for a MSDU aggregation;
   a threshold for a MPDU aggregation;
   a threshold for fragmentation;
   a threshold for protection;
   the format and a header field of data frames;
   the format and a header field of control frames; and
   the format and a header field of management frames.

18. The device according to claim 13, wherein the access parameter comprises at least one of the following parameters:
   a size of time windows;
   a size of an interframe space; a size of a time slot;
   a starting and ending time of slot times;
   limits of a contention window; a MAC cycle structure;
   a maximum size and minimum size of a time window;
   a counter value;
   a maximum and minimum value of a counter value;
   a transmission rate for retransmission;
   a rate selection adaption scheme.

19. The device according to claim 11, further comprising
   a first PHY circuit;
   a second PHY circuit;
   a switch to selectively couple the medium access controller to the first and second PHY circuits based on the information indicating a transmission medium.

20. The device according to claim 11 wherein the entity is adapted to enable and disable functional MAC blocks.

21. The device according to claim 11 wherein the entity is adapted to change an order of MAC processing functions.

22. A home network system comprising:
   a gateway device connectable to a plurality of distinct transmission media, the gateway device including:
   a medium access controller, wherein the medium access controller comprises a single medium access controller (MAC), wherein the medium access controller includes at least a plurality of functional blocks that are each configurable with respect to one or more parameters to enable communication with a plurality of distinct transmission media; and
   an entity to configure the medium access controller based on information indicating a transmission medium used by the gateway device for transmitting in the home network system
   wherein the entity further configures the medium access controller based on the indicated transmission medium by setting said one or more parameters for the indicated transmission medium that form a superset of functions to allow full media access controller operation for the indicated transmission medium.

* * * * *